United States Patent [19]

Eblen

[11] 4,354,324
[45] Oct. 19, 1982

[54] FISHING ROD HOLDING DEVICE

[76] Inventor: James H. Eblen, 1150 W. Panhandle St., Slaton, Tex. 79364

[21] Appl. No.: 214,276

[22] Filed: Dec. 8, 1980

[51] Int. Cl.³ .......................................... A01K 91/06
[52] U.S. Cl. ........................................................ 43/15
[58] Field of Search ...................................... 43/15, 16

[56] References Cited

U.S. PATENT DOCUMENTS

| | | | |
|---|---|---|---|
| 77,893 | 5/1868 | Koehler | 43/15 |
| 2,784,516 | 3/1957 | Barnes et al. | 43/16 |
| 2,851,812 | 9/1958 | Beck | 43/15 |
| 2,984,039 | 5/1961 | Willey | 43/15 |

Primary Examiner—Stephen G. Kunin
Assistant Examiner—K. Bradford Adolphson

[57] ABSTRACT

This device is for the purpose of setting a fishhook or lure in a fish's mouth, when the fish strikes and the fishing rod is unattended, and it consists primarily of a box for the placement of the rod butt. It further includes an adjustable length base member, for properly flexing the fishing rod, and it also includes a self setting mast assembly with a seer action, for release of the rod end, when the line is pulled.

2 Claims, 2 Drawing Figures

U.S. Patent

Oct. 19, 1982

4,354,324

FISHING ROD HOLDING DEVICE

This invention relates to fishing accessories, and more particularly, to a fishing rod holding device.

It is, therefore, the principal object of this invention to provide a fishing rod holding device, which will hold a fishing rod in a flexed condition, while being unattended, so as to set the fishhook in a fish, when it strikes.

Another object of this invention is to provide a fishing rod holder, which will be adjustable for fishing rods of different lengths.

A further object of this invention is to provide a fishing rod holder, which will be adaptable to fishing rods of different cross-sectional diameters.

Other objects of the present invention are to provide a fishing rod holding device, which is simple in design, inexpensive to manufacture, rugged in construction, easy to use and efficient in operation.

Figure 1:
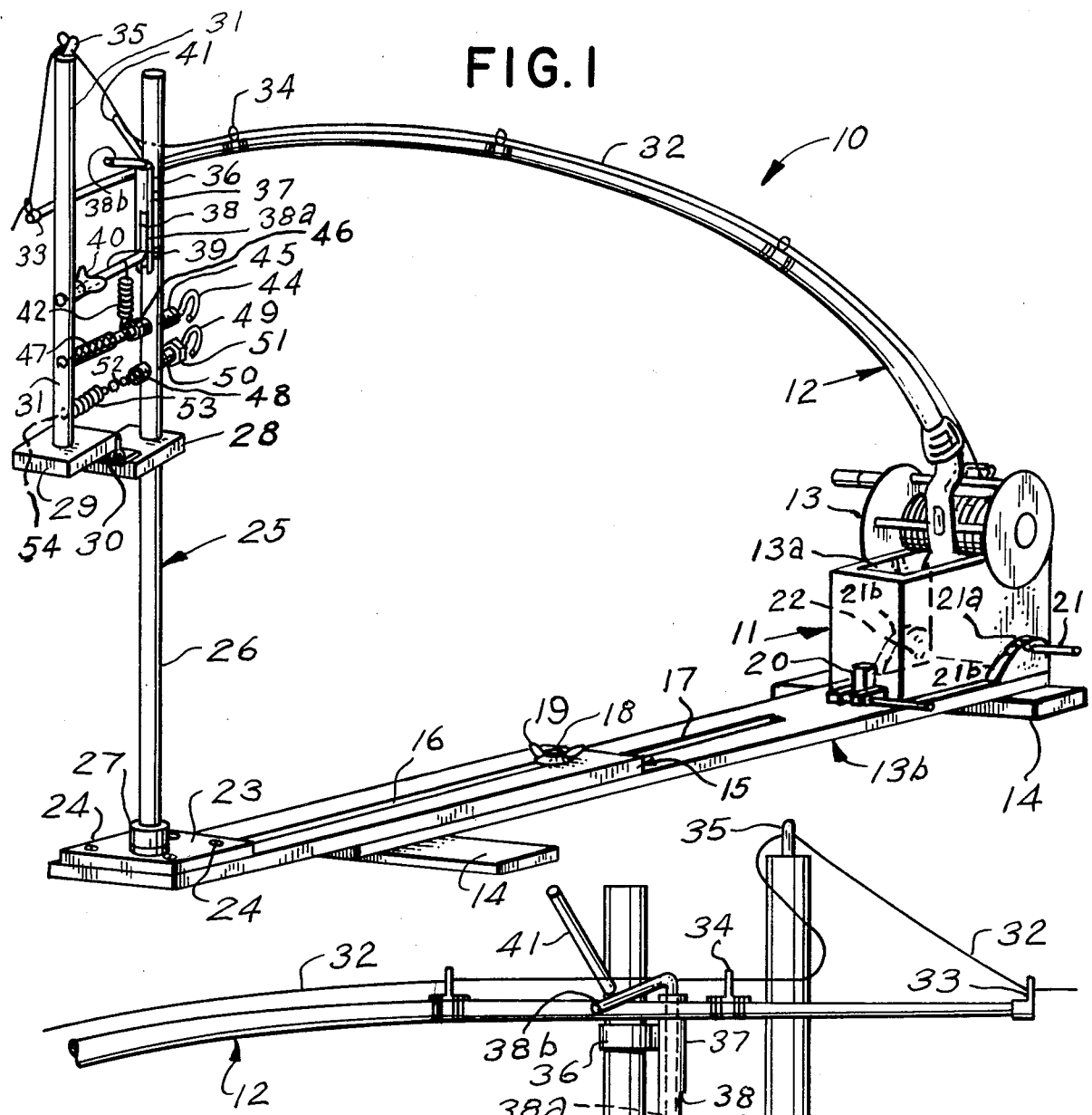
Figure 2:
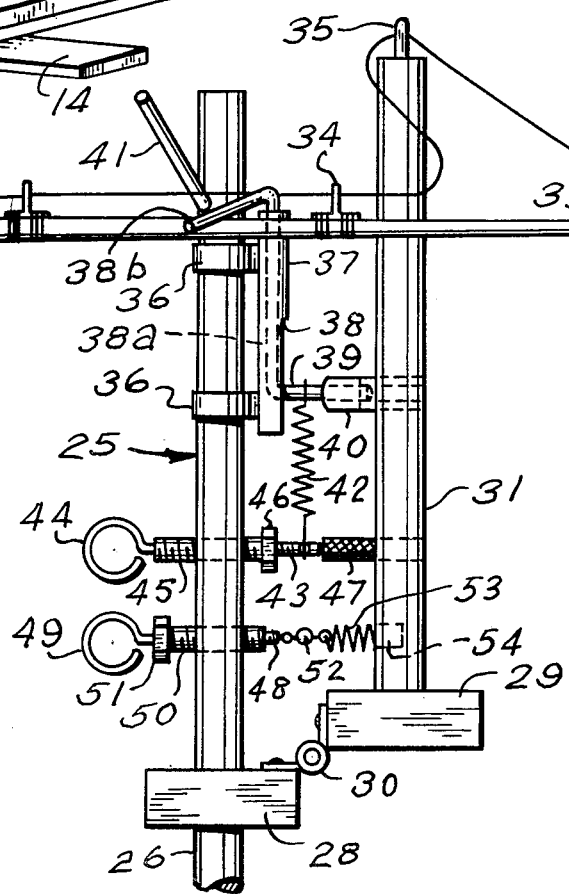

These, and other objects, will be readily evident, upon a study of the following specification, and the accompanying drawing, wherein:

FIG. 1 is a perspective view of the present invention, showing a fishing rod held therein, and FIG. 2 is an enlarged fragmentary left side view of the mast assembly of FIG. 1, shown in elevation.

According to this invention, device 10 is shown to include a hollow box 11, in which the butt (not shown) of fishing rod 12 is placed, leaving the fishing reel 13 extending from the top 13a. An elongated base plate 13b extends from beneath box 11, and has, fixedly secured to each of its ends, a plate 14 at right angles, so as to provide side support means, upon a surface on which device 10 is placed. A sliding plate 15 is received on top of base plate 13b, which includes an elongated slot 16 therethrough, which aligns with a similar slot 17 in base plate 13b, for receiving a bolt fastener 18, that receives a winged nut fastener 19, for adjusting the length of device 10. Box 11 is secured to one end of base plate 13b, by a hinge 20 at the front of box 11, and a pin 21, extending through the sides, may be removed from the upper opening 21a in anchor extensions 21b secured to plate 13b, and pin 21 is placed in the lower openings 22 of the box 11, so as to reduce stress on the fishing rod 12, when it is necessary, by tilting box 11 on hinge 20.

A plate is secured to the extending end of sliding plate 15, by means of suitable fasteners 24, and plate 15 supports the mast assembly 25 of device 10. An end of rod 26 of mast assembly 25 is removably received in a sleeve 27, that is fixedly secured to plate 23 by suitable means. A locking means, such as a set-screw (not shown), is received in sleeve 27, so as to prevent rod 26 from being pulled out, when device 10 is in use. A block 28 is fixedly secured to rod 26, in a suitable manner, and is secured, at one side, to one side of a similar block 29, by hinge 30 means, and block 29 is fixedly secured to the bottom end of pivotal arm 31. When device 10 is set, the fishing line 32, extending between the first ferrule 33 and the second ferrule 34, is removably received between the ends of a fork member 35, which is fixedly secured, in a suitable manner, to the upper end of pivotal arm 31. The fork member 35 is smaller at its base than at its top, so as to hold the fishing line 32 frictionally therein.

Near the upper end of rod 26, a pair of spaced-apart collars 36 are fixedly secured by suitable means, and collars 36 are fixedly secured to a seer tube 37, having a slot 38 through its wall, for receiving freely a seer pin 38a, one arm 38b of which may engage over the fishing rod 12, and the other arm 39 being releasably and springingly received in a seer receiver member 40, that is fixedly secured transversely through pivotal arm 31. A ramp pin 41 is secured fixedly at an angle near the upper end of rod 26, and provides retaining means for arm 38b of seer pin 38a. A tension spring 42 is secured, at one end, to arm 39 of seer pin 38a, and is secured, at its opposite end, to seer relief bolt 43, having an eye 44. Bolt 43 is threadingly received in threaded sleeve 45, having a nut 46 portion on its end, and bolt 43 is in contact with knurled stud 47, received transversely in arm 31. An arm return bolt 48 with an eye 49, on one end, is received threadingly within threaded sleeve 50, which includes a nut 51 on one end, and the opposite end of bolt 48 is hooked to a common swivel 52, that is attached to a return spring 53, the opposite end of spring 53 being secured within a spring keeper 54 of pivotal arm 31.

To use device 10, eye 49 is turned to pull in arm 31, so as to enable the seer arm 39 to be engaged in the seer receiver 40.

The fisherman, after casting rod 12, inserts the butt or handle of the rod 12 into the box 11. He then bends the rod 12 over, until it will fit under the arm 38b of seer pin 38a. By pulling the fishing line 32 tight, and picking up the line 32 between the end ferrules 33 and 34 of rod 12, this portion of the line 32 is placed within the fork 35 of pivotal arm 31. When a fish strikes, it will pull the line 32, which will move forward, and pull the arm 39 of the seer pin 38a out of the seer receiver member 40 of arm 31. The aforementioned will then cause the seer pin 38a to move up with the fishing rod 12, and, as the fishing rod 12 tip and seer pin arm 38b pass the ramp pin 41 of rod 26, the rod 12 will be pushed away from seer pin arm 38b, and rod 12 will snap back, and thus pull the line 32 out of fork member 35.

It shall be noted, that when arm 31 is pivoted away, at its top, towards the ferrule 33 of fishing rod 12, rod 31 is pivoted away from the seer arm 39. The fishing rod 12 is normally held down, under the tension of the seer pin 38a and its spring 42, and, when fishing rod 12 is released, seer pin 38a moves up in its housing 37, by the spring tension of the fishing rod 12. As the fishing rod 12 is released, it strikes the ramp pin 41 with force, and the fishing rod 12 is displaced to the right, far enough to clear the seer arm 38b, and, in turn, it pulls the line 32 out of fork member 35.

It shall further be noted, that when setting device 10, the fishing rod 12 tip must be level, when the rod 12 is bent, and placed under the seer pin arm 38b. If tension on the rod 12 is too great, the rod 12 tip will be down. To correct the above mentioned condition, the base plate 13b combination must be extended, so as to enable the mast assembly 25 to line up under the second and third ferrules of the rod 12 tips. If the rod 12 stress is not great enough, the base plate 13 combination may be shortened until the rod 12 tip is level, when placed under the seer pin arm 38b. If the stress on rod 12 is still too great, then the box 11 may be tilted by the hinge 20, and to reduce stress further, the pin 21 is removed from opening 21a, and is placed in opening 22.

While various changes may be made in the detail construction, it is understood that such changes will be within the spirit and scope of the present invention, as is defined by the appended claims.

What I now claim is:

1. A fishing rod holding device, comprising, in combination, a base, a box secured to said base for removably receiving the butt end of said fishing rod, a post removably secured to said base, for holding said fishing rod in a flexed condition, said post including a hinged arm with a seer pin receiving member, which engages a seer pin of said post secured to said base, and said seer pin serves as a means of engaging and retaining the forward end portion of said fishing rod in flexed condition, until a fish strikes the fishing line of said fishing rod, and a block is fixedly secured to said post and is hinged by a hinge secured at one side, to one side of a second block fixedly secured to one end of said hinged arm, and a seer pin receiving tube is fixedly secured to said post and includes an elongated slot in its wall, for freely and slideably receiving said seer pin, and an arm integrally attached to one end of said seer pin projects from the elongated slot and is removably received in said seer pin receiving member, which is flared at its projecting end which receives said arm, and its opposite end is fixedly secured in said hinged arm by suitable means, and a second arm which is integrally attached to said seer pin, and is angularly disposed at the opposite end of said seer pin, engages over said fishing rod near its front tip, and said arm, extending from the elongated slot of said seer pin receiving tube, is held downwards in said seer pin receiving tube by a coil spring, which is received on said seer pin arm at one end, and the opposite end of said spring is received on a bolt transversely received through said post secured to said base, and when said device is set, said fishing rod is placed by the user in a fork member secured fixedly in the top end of said hinged arm.

2. The combination according to claim 1, wherein said fishing line, between the two end ferrules of said fishing rod, when pulled by a fish striking said line, will, by friction means, pull said fork member, which will simultaneously pivot said hinged arm away from the upper end of said post in said base, and said second arm of said seer pin will disengage from said fishing rod, and said seer pin will be urged downwardly by said coil spring, and when said fishing rod returns upwards by spring tension, said fishing rod strikes an off-set ramp in, fixedly secured in the upper portion of said post received in said base, which will cam said fishing rod away from said post secured in said base, and away from said seer pin.

* * * * *